(12) United States Patent
Zheng (10) Patent No.: US 9,666,165 B2
(45) Date of Patent: May 30, 2017

(54) BACKLIGHT COMPENSATION METHOD, DEVICE AND TERMINAL

(71) Applicant: ZTE Corporation, Shenzhen (CN)

(72) Inventor: Liang Zheng, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 14/422,608

(22) PCT Filed: Jul. 17, 2013

(86) PCT No.: PCT/CN2013/079499
§ 371 (c)(1),
(2) Date: Mar. 24, 2015

(87) PCT Pub. No.: WO2013/178145
PCT Pub. Date: Dec. 5, 2013

(65) Prior Publication Data
US 2015/0221284 A1 Aug. 6, 2015

(30) Foreign Application Priority Data

Aug. 23, 2012 (CN) .......................... 2012 1 0302689

(51) Int. Cl.
*G09G 5/10* (2006.01)
*G09G 5/02* (2006.01)
(Continued)

(52) U.S. Cl.
CPC ............... *G09G 5/10* (2013.01); *H04N 5/235* (2013.01); *H04N 5/23293* (2013.01)

(58) Field of Classification Search
CPC combination set(s) only.
See application file for complete search history.

(56) References Cited

U.S. PATENT DOCUMENTS 6,859,618 B1 2/2005 Yip
7,982,791 B2 7/2011 Nonaka et al.
(Continued)

FOREIGN PATENT DOCUMENTS

CN 101102408 A 1/2008
CN 101282425 A 10/2008
(Continued)

OTHER PUBLICATIONS

PCT International Search Report for PCT Application No. PCT/CN2013/079499 mailed Oct. 24, 2013 (6 pages).
(Continued)

*Primary Examiner* — Wesner Sajous
(74) *Attorney, Agent, or Firm* — Eversheds Sutherland (US) LLP (57) ABSTRACT

The embodiments of the present invention provide a backlight compensation method, apparatus and terminal. The apparatus comprises: an acquisition module configured to acquire a preview image; a judgment module configured to judge whether backlight compensation needs to be performed on the preview image; a calculation module configured to calculate a compensation parameter of a compensation light source; a compensation module configured to perform backlight compensation on the preview image according to the compensation parameter; and a display module configured to display the preview image. The terminal comprises an image pick-up apparatus, a storage device and a backlight compensation apparatus. The backlight compensation apparatus is configured to calculate a compensation parameter according to a preview image acquired by the image pick-up apparatus, and perform backlight compensation on the preview image.

10 Claims, 5 Drawing Sheets

(51) Int. Cl.
*H04N 5/57* (2006.01)
*H04N 5/235* (2006.01)
*H04N 1/60* (2006.01)
*H04N 5/232* (2006.01)

(56) References Cited

U.S. PATENT DOCUMENTS

| | | | | |
|---|---|---|---|---|
| 2007/0104475 A1* | 5/2007 | Cheng | G03B 7/08 | 396/234 |
| 2008/0225136 A1* | 9/2008 | Yamada | H04N 5/2351 | 348/229.1 |
| 2009/0322800 A1* | 12/2009 | Atkins | G09G 3/3413 | 345/690 |
| 2010/0007599 A1* | 1/2010 | Kerofsky | G09G 3/3413 | 345/102 |
| 2010/0053222 A1* | 3/2010 | Kerofsky | G09G 3/3406 | 345/690 |
| 2010/0085361 A1* | 4/2010 | Kim | G06T 5/008 | 345/428 |
| 2012/0075362 A1* | 3/2012 | Ichioka | G09G 3/3426 | 345/690 |
| 2014/0210841 A1* | 7/2014 | Song | G09G 3/34 | 345/589 |

FOREIGN PATENT DOCUMENTS

| | | |
|---|---|---|
| CN | 102006422 A | 4/2011 |
| JP | S59-84229 A | 5/1984 |
| JP | 2009-071404 A | 4/2009 |
| JP | 2010-056853 A | 3/2010 |
| JP | 2010283593 A | 12/2010 |

OTHER PUBLICATIONS

Japanese Office Action for JP Application No. 2015-527766 mailed May 24, 2016 (4 pages).

* cited by examiner

BACKLIGHT COMPENSATION METHOD, DEVICE AND TERMINAL

CROSS REFERENCE TO RELATED APPLICATIONS

This application claims the priority benefit of PCT/CN2013/079499 filed on Jul. 17, 2013 and Chinese Application No. 201210302689.4 filed on Aug. 23, 2012. The contents of these applications are hereby incorporated by reference in their entirety

TECHNICAL FIELD

The present document relates to the field of image information processing, and in particular, to a backlight compensation method, apparatus and terminal.

BACKGROUND OF THE RELATED ART

With the popularization of photo taking and image pickup technologies, current handheld mobile devices such mobile phones etc. are mostly installed with a camera having a flash light. During a backlight photo taking process, a condition that there are some dark portions and some bright portions often occurs in the same frame image; while the automatic exposure algorithm which is widely used in the current image pickup equipment uses an average brightness value of the entire image as a reference value, which will result in the dark portions not being able to be exposed enough and the overall imaging effect being not good. At the same time, the flash light has the following disadvantages:

Firstly, the flash light is fixed, and is focused on the middle section, and when dark regions occur in the surrounding, the compensation of the flash light is limited. Secondly, for the flash light, the average brightness value of the whole image is used as the reference value, and only when the average brightness value is less than a threshold for turning on the flash light, the flash light will turn on. In this case, the interested regions with local dark portions cannot be considered during a backlight photo taking process, and it is also difficult to improve the quality of the picked-up image in the case of backlight.

Therefore, how to provide a backlight compensation technology in which exposure parameters are controllable is a technical problem to be solved by those skilled in the art.

SUMMARY

The embodiments of the present invention provide a backlight compensation method, apparatus and terminal, to solve the problem that the compensation parameters of the flash light of the current pickup device are uncontrollable.

The present document firstly provides a backlight compensation method, in an embodiment, the method comprising acquiring a preview image;

judging whether backlight compensation needs to be performed;

if yes, calculating a compensation parameter of a compensation light source, and performing backlight compensation on the preview image; and if not, displaying the preview image.

In order to apply the backlight compensation method according to the above embodiment, the present document provides a backlight compensation apparatus, in an embodiment, the apparatus comprising: an acquisition module, a judgment module, a calculation module, a compensation module and a display module, wherein, the acquisition module is configured to: acquire a preview image;

the judgment module is configured to: judge whether backlight compensation needs to be performed on the preview image;

the calculating module is configured to: when backlight compensation needs to be performed on the preview image, calculate a compensation parameter of a compensation light source;

the compensation module is configured to: when backlight compensation needs to be performed on the preview image, perform the backlight compensation on the preview image according to the compensation parameter; and the display module is configured to: display the preview image or a preview image after the backlight compensation.

In an embodiment, the judgment module in the above embodiment comprises a first judgment unit configured to: detect whether there is a dark region in the preview image; if yes, notify the calculation module to calculate the compensation parameter of the compensation light source; and if not, notify the display module to display the preview image.

In an embodiment, the calculation module in the above embodiment comprises a first calculation unit;

the first calculation unit is configured to: calculate a first average brightness value of a unit frame in the preview image, calculate a second average brightness value of the preview image according to the first average brightness values of all unit frames, and calculate a first threshold according to the second average brightness value;

the first judgment unit is further configured to: compare the first average brightness values of all unit frames in the preview image with the first threshold, and judge whether there is a first average brightness value of any unit frame being less than the first threshold; if yes, there is a dark region in the preview image, and the dark region is formed by connecting all adjacent units frames of which the first average brightness values are less than the first threshold.; and if not, there is no dark region in the preview image.

In an embodiment, the calculation module in the above embodiment further comprises a second calculation unit, wherein, the first calculation unit is further configured to: calculate a position of the dark region and a third average brightness value of the dark region, and acquire a second threshold; and the second calculation unit is configured to: calculate an initial position of the compensation light source, calculate the compensation direction of the compensation light source according to the initial position of the compensation light source and the position of the dark region; and is further used to calculate the compensation intensity of the compensation light source according to the second average brightness value, the third average brightness value and the second threshold.

In an embodiment, the compensation parameter in the above embodiment comprises a compensation direction and compensation intensity of the compensation light source.

In an embodiment, the judgment module in the above embodiment further comprises a second judgment unit configured to: judge whether the backlight compensation is successful; if not, notify the calculation module and the compensation module to perform the backlight compensation again until the backlight compensation is successful; and if yes, display a preview image after the backlight compensation and reset the compensation parameter of the compensation light source.

The present document further provides a backlight compensation terminal, in an embodiment, in addition to an image pick-up apparatus and a storage apparatus, the backlight compensation terminal further comprises the backlight compensation apparatus in the above embodiment; and the backlight compensation apparatus is configured to acquire a preview image through the image pick-up apparatus, detect whether backlight compensation needs to be performed on the preview image, and if yes, calculate a compensation parameter and perform the backlight compensation on the preview image; and the storage apparatus is configured to store an image after the backlight compensation which is picked up by a user.

The embodiments of the present invention have the following beneficial effects: firstly, the backlight compensation method can calculate the compensation parameter according to the preview image, and specifically control the compensation light source according to the compensation parameter, which has a prominent progress as compared to the flash light in the prior art which cannot control the compensation parameter; secondly, the backlight compensation method judges whether it needs to perform backlight compensation by detecting whether there is a dark region in the preview image, which can achieve more accurate control of the backlight compensation as compared to the current manner of judging whether the flash light is to be turned on according to the average brightness value of the preview image; then, the backlight compensation method calculates the compensation parameter of the compensation light source by analyzing the position and average brightness value of the dark region, which has accurate control; and finally, the backlight compensation method detects whether the compensation for the image after backlight compensation is successful, to ensure the effects of the backlight compensation. In conclusion, with the embodiments of the present invention, a backlight compensation method, apparatus and terminal with a controllable compensation parameter are provided; and when a user performs backlight pick-up using a pick-up device, backlight compensation can be automatically performed on the preview image, so as to display an image with perfect image quality to the user, which improves the user experience.

PREFERRED EMBODIMENTS OF THE PRESENT INVENTION

The embodiments of the present invention will be described below in detail in conjunction with the accompanying drawings. It should be illustrated that without a conflict, the embodiments in the present application and the features in the embodiments can be randomly combined with each other.

Figure 1:
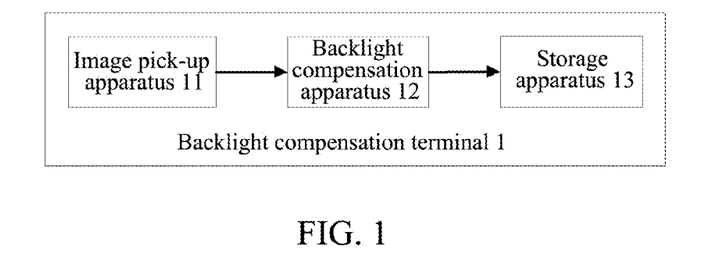
FIG. 1 is a structural diagram of a backlight compensation terminal 1 according to an embodiment of the present invention.

FIG. 1 is a structural diagram of a backlight compensation terminal 1 according to an embodiment of the present invention.

It can be known from FIG. 1 that in an embodiment, the backlight compensation terminal 1 according to the present invention document comprises an image pickup apparatus 11, a backlight compensation apparatus 12 and a storage apparatus 13; wherein, the image pickup apparatus 11 is configured to pick up an image such as a scene, a character or an animal etc.;

the backlight compensation apparatus 12 is configured to acquire a preview image through the image pickup apparatus 11, detect whether backlight compensation needs to be performed on the preview image, if yes, calculate a compensation parameter, control the compensation light source according to the compensation parameter to perform the backlight compensation on the preview image, and display a preview image after the backlight compensation to a user; and the storage apparatus 13 is configured to store the picked-up image;

the image pickup apparatus 11 in the above embodiment comprises but is not limited to camera apparatuses with various resolutions in the prior art, and the storage apparatus 13 comprises but is not limited to memory cards with various capacities in the prior art.

Figure 2:
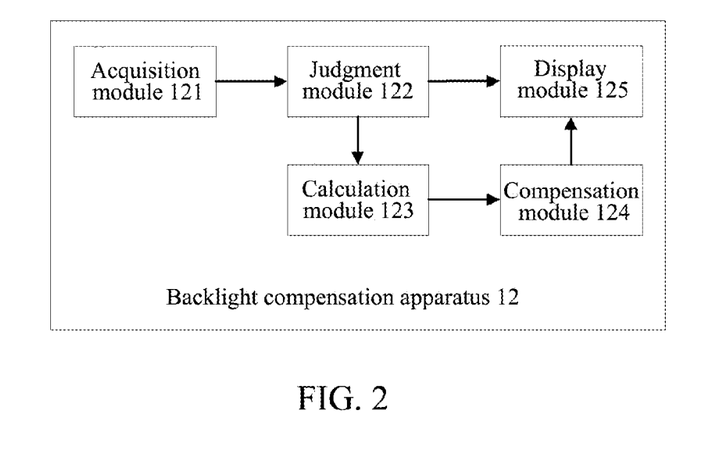
FIG. 2 is a structural diagram of a backlight compensation apparatus 12 according to an embodiment of the present invention.

FIG. 2 is the structural diagram of a backlight compensation apparatus 12 in the backlight compensation terminal 1 as shown in FIG. 1.

It can be known from the FIG. 2, in an embodiment, the backlight compensation apparatus 12 in the backlight compensation terminal 1 as shown in FIG. 1 comprises: a acquisition module 121, a judgment module 122, a calculation module 123, a compensation module 124 and a display module 125; wherein, the acquisition module 121 is configured to acquire a preview image of an object to be picked up through the image pickup apparatus 11;

the judgment module 122 is configured to judge whether backlight compensation needs to be performed on the preview image acquired by the acquisition module 121;

the calculation module 123 is configured to when the backlight compensation needs to be performed on the preview image, calculate a compensation parameter of a compensation light source;

the compensation module 124 comprises at least one compensation light source, and is configured to perform the backlight compensation on the preview image according to the compensation parameter calculated by the calculation module 123 when the backlight compensation needs to be performed on the preview image; and the display module 125 is configured to display to a user the preview image or a preview image after the backlight compensation, and comprises but is not limited to various display apparatuses, such as an LED etc.

Figure 3:
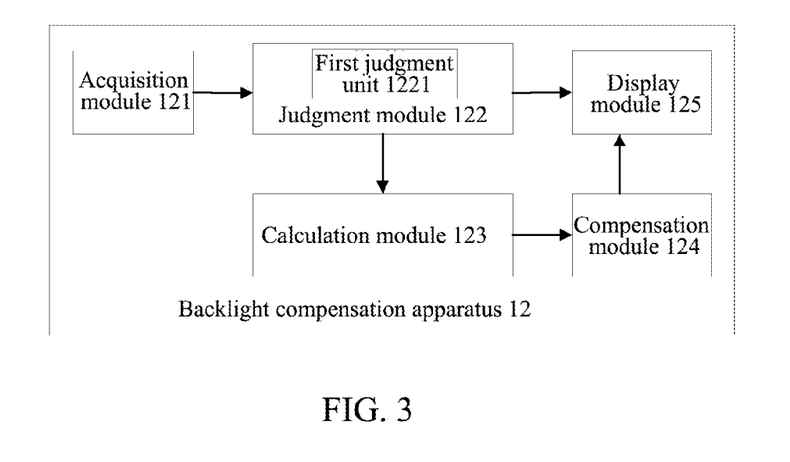
FIG. 3 is a structural diagram of a backlight compensation apparatus 12 according to an embodiment of the present invention.

FIG. 3 is a structural diagram of the backlight compensation apparatus 12 shown in FIG. 2 according to an embodiment.

It can be known from the FIG. 3 that, in an embodiment, the judgment module 122 in the above embodiment comprises a first judgment unit 1221, which is configured to detect whether there is a dark region in the preview image; if yes, notify the calculation module 123 to calculate the compensation parameter of the compensation light source according to the preview image; and if not, notify the display module 125 to display the preview image.

Figure 4:
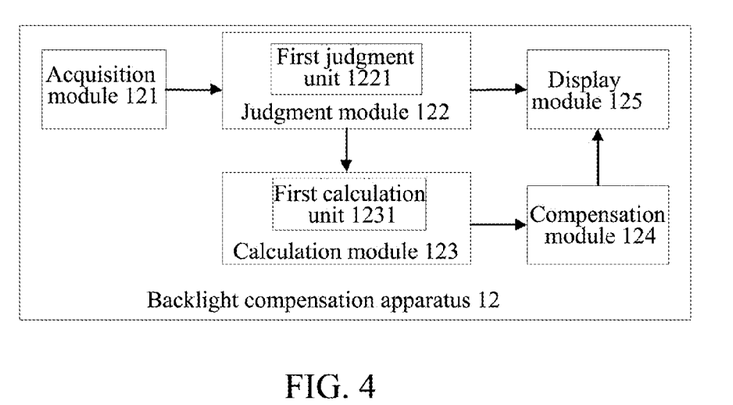
FIG. 4 is a structural diagram of a backlight compensation apparatus 12 according to an embodiment of the present invention.

FIG. 4 is a structural diagram of the backlight compensation apparatus 12 shown in FIG. 3 according to an embodiment.

It can be known from the FIG. 4 that, in an embodiment, the calculation module 123 in the above embodiment comprises a first calculation unit 1231; and at this time, the calculation unit 1231 is configured to calculate a first average brightness value L1 of a unit frame in the preview image; calculate a second average brightness value L2 of the preview image according to first average brightness values L1 of all unit frames, and calculate a first threshold Th1 according to the second average brightness value L2;

the first judgment unit 1221 is further configured to compare the first average brightness values L1 of all unit frames in the preview image with the first threshold Th1, and judge whether there is a first average brightness value L1 of any unit frame that is less than the first threshold Th1; if yes, there is a dark region in the preview image, and the dark region is formed by connecting all adjacent units frames of which first average brightness values are less than the first threshold; and if not, there is no dark region in the preview image.

In the above embodiment, the first threshold Th1 may be a specific brightness value set by a user (or determined by a terminal system by default), for example, Th1=0.5 Candela per square meter; and of course, the first threshold may also be a brightness value which is calculated by the first calculation unit 1231 by multiplying a proportional coefficient K1 (which may be determined according to experience or statistics) set by a user (or determined by a terminal system by default) with the second average brightness value L2 of the preview image, i.e., Th1=K1*L2.

Figure 5:
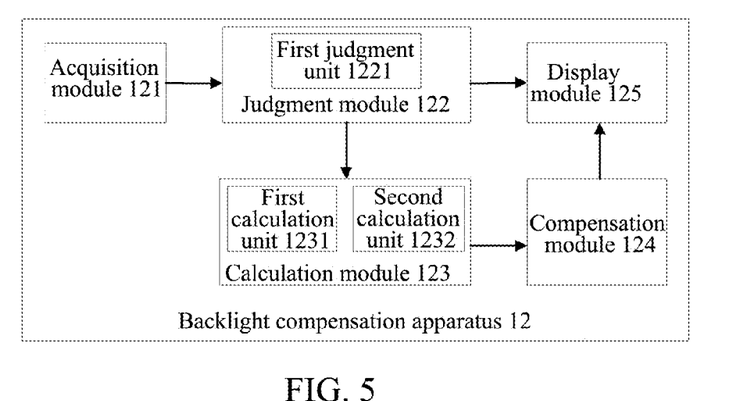
FIG. 5 is a structural diagram of a backlight compensation apparatus 12 according to an embodiment of the present invention.

FIG. 5 is a structural diagram of the backlight compensation apparatus 12 shown in FIG. 4 according to an embodiment.

It can be known from the FIG. 5 that, in an embodiment, the compensation parameter in the above embodiment comprises a compensation direction and compensation intensity of the compensation light source; and the calculation module 123 in the above embodiment further comprises a second calculation unit 1232;

the first calculation unit 1231 is further configured to calculate a position of the dark region and a third average brightness value L3 of the dark region, and acquire a second threshold Th2;

the second calculation unit 1232 is configured to calculate an initial position of the compensation light source, and calculate the compensation direction of the compensation light source according to the initial position of the compensation light source and the position of the dark region; and is further configured to calculate the compensation intensity of the compensation light source according to the second average brightness value L2, the third average brightness value L3 and the second threshold Th2.

In the above embodiment, the second threshold Th2 may also be a specific reference value or a specific brightness relationship value set by a user (or determined by a terminal system by default); the terminal simulates and calculates according to the second threshold Th2 the intensity which is needed by the backlight compensation light source so that there is no dark region in the preview image after the compensation, and change in brightness of various regions in the whole preview image is perfect; while a method for calculating the second threshold Th2 comprises: determining proportional coefficients K2 and K3 according to an empirical formula or statistics; now it is assumed that after the backlight compensation, the second average value of the preview image is L2', the third average brightness value of the dark region is L3', and only when L2' and L3' and the second threshold Th2 satisfy the following condition, it is considered that the backlight compensation is completed. The condition needed to be satisfied is as follows:

$$K2*L2'<L3'(L3'=\text{second threshold } Th2)<K3*L2'.$$

Figure 6:
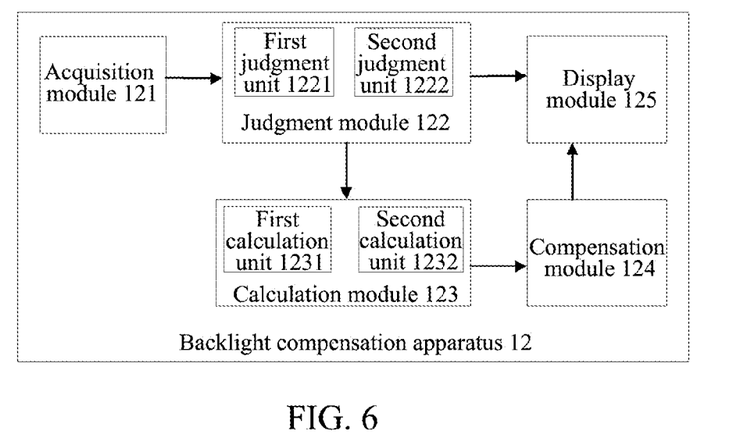
FIG. 6 is a structural diagram of a backlight compensation apparatus 12 according to an embodiment of the present invention.

FIG. 6 is a structural diagram of the backlight compensation apparatus 12 shown in FIG. 5 according to an embodiment.

It can be known from the FIG. 6 that, in an embodiment, the judgment module 122 in the above embodiment further comprises a second judgment unit 1222, configured to judge whether the backlight compensation is successful; if not, notify the calculation module 123 and the compensation module 124 to perform the backlight compensation again until the backlight compensation is successful; and if yes, notify the display module 125 to display the preview image after the backlight compensation and notify the compensation module 124 to reset the compensation parameter of the compensation light source.

Figure 7:
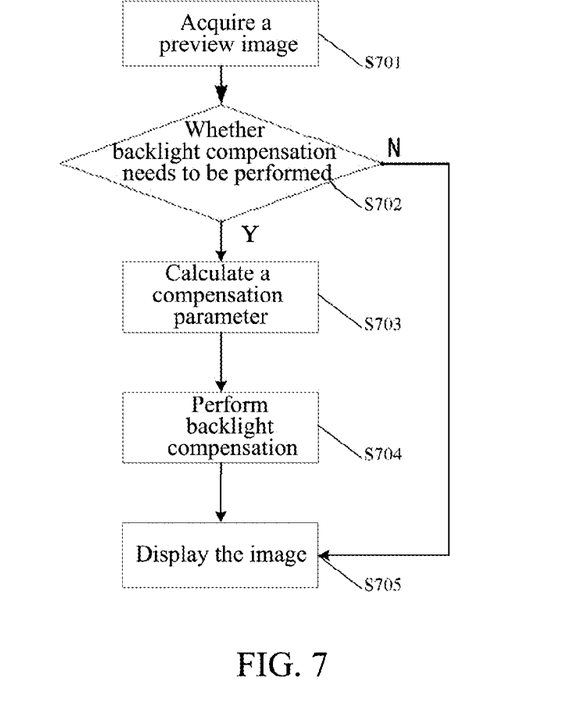
FIG. 7 is a flowchart of a backlight compensation method according to an embodiment of the present invention.

In order to enable the present document to be better applied to real life, the present document provides a backlight compensation method which is used cooperatively. FIG. 7 is a flowchart of a backlight compensation method according to the embodiment of the present invention.

It can be known from the FIG. 7 that, in an embodiment, the backlight compensation method according to the present document comprises the following steps.

In S701, a preview image is acquired;

in S702, it is judged whether backlight compensation needs to be performed; if yes, step S703 is performed; and if not, and step S705 is performed;

in S703, a compensation parameter of a compensation light source is calculated;

in S704, backlight compensation is performed on the preview image according to the compensation parameter; and in S705, the preview image or the proceeded preview image is displayed.

In an embodiment, step 702 in the backlight compensation method shown in FIG. 7 comprises:

detecting whether there is a dark region in the preview image;

if yes, the backlight compensation needs to be performed; and if not, the backlight compensation needs not to be performed.

In an embodiment, the step of detecting whether there is a dark region in the preview image in the above embodiment comprises:

calculating a first average brightness value of a unit frame in the preview image;

calculating a second average brightness value of the preview image according to first average brightness values of all unit frames;

determining a first threshold according to the second average brightness value;

comparing the first average brightness values of all unit frames with the first threshold, and judging whether there is a first average brightness value of any unit frame being less than the first threshold;

if yes, there is a dark region in the preview image, and the dark region is formed by connecting all adjacent units frames of which first average brightness values are less than the first threshold;

otherwise, there is no dark region in the preview image.

In an embodiment, the step of calculating a compensation parameter in the above embodiment comprises:

calculating a position and a third average brightness value of the dark region;

calculating an initial position of the compensation light source;

calculating the compensation direction of the compensation light source according to the initial position of the compensation light source and the position of the dark region; and acquiring a second threshold, and calculating the compensation intensity of the compensation light source according to the second average brightness value, the third average brightness value and the second threshold.

In an embodiment, in the backlight compensation method illustrated in FIG. 7, after performing backlight compensation on the preview image, the method further comprises the following steps:

judging whether the backlight compensation is successful;

if not, performing the backlight compensation again until the backlight compensation is successful; and if yes, displaying a preview image after the backlight compensation.

In order to better explain the idea of the present document, the embodiments of the present invention will be complementally described below in conjunction with application examples.

Figure 8:
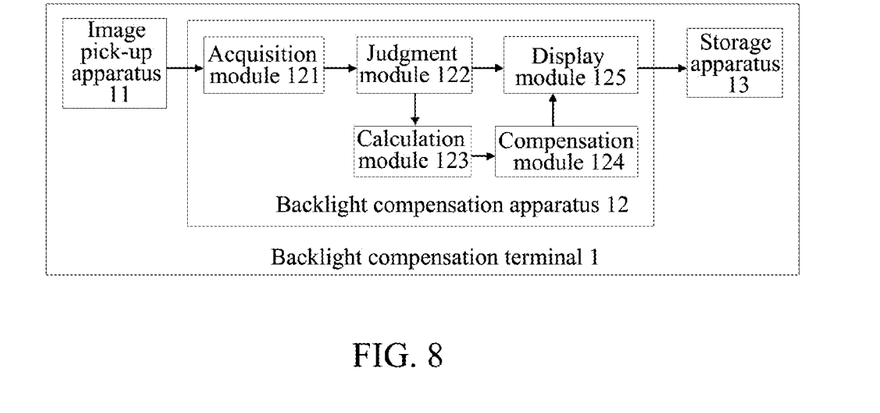
FIG. 8 is a structural diagram of a backlight compensation terminal 1 according to a most preferable embodiment of the present invention.
Figure 9:
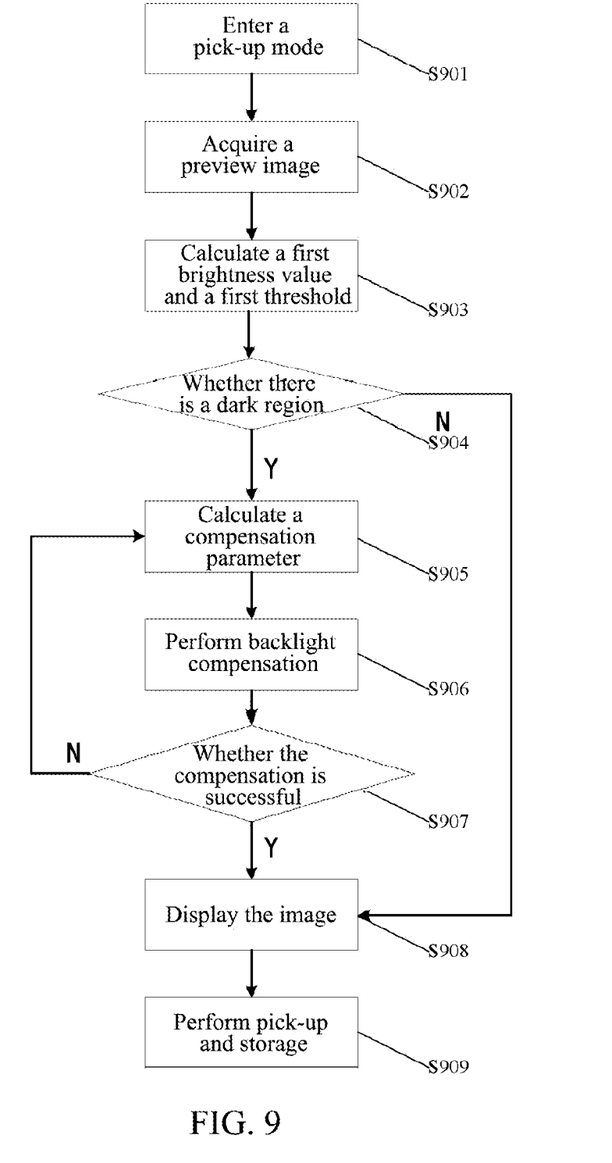
FIG. 9 is a flowchart of a backlight compensation method according to a most preferable embodiment of the present invention.

FIG. 8 is a structural diagram of a backlight compensation terminal according to the present embodiment, and FIG. 9 is a flowchart of a backlight compensation method according to the present embodiment.

It can be known from FIG. 8 that in the present embodiment, the backlight compensation terminal 1 comprises an image pick-up apparatus 11, a backlight compensation apparatus 12 and a storage apparatus 13; wherein, the backlight compensation apparatus 12 comprises a backlight compensation module 121, a judgment module 122 (which comprises a first judgment unit 1221 and a second judgment unit 1222 (not shown in FIG. 8)), a calculation module 123 (which comprises a first calculation unit 1231 and a second calculation unit 1232 (not shown in FIG. 8)), a compensation module 124 and a display module 125. A connection relationship among various functional modules and functions thereof have been described in detail above, and will not be described here.

It can be known from FIG. 9 that in the present embodiment, the backlight compensation method comprises the following steps.

In S901, a user starts to invoke an image pick-up application, and the backlight compensation terminal enters a pick-up mode;

in S902, the acquisition module 121 in the backlight compensation apparatus acquires a preview image through an image pick-up apparatus (camera etc.);

in S903, the first calculation unit 123 in the calculation module 123 calculates a first average brightness value, a second average brightness value and a first threshold;

the first calculation unit 1231 calculates a first average brightness value of a unit frame in the preview image, calculates a second average brightness value of the preview image according to first average brightness values of all unit frames, and further calculates and acquires a first threshold according to the second average brightness value, and transmits them to the first judgment unit 1221;

in S904, the first judgment unit 1221 in the judgment module 122 judges whether there is a dark region; if yes, step S905 is performed; and if not, step S908 is performed;

the first judgment unit 1221 compares the first average brightness values of all unit frames with the first threshold, and judges whether there is a first average brightness value of any unit frame being less than the first threshold; if yes, there is a dark region in the preview image, and the dark region is formed by connecting all adjacent units frames of which first average brightness values are less than the first threshold; and if not, there is no dark region in the preview image;

in S905, the second calculation unit 1232 in the calculation module 123 calculates a compensation parameter, and transmits the compensation parameter to the compensation module 124;

the first calculation unit 1231 calculates and records a position of the dark region acquired by the first judgment unit 1221 and a third average brightness value of the dark region, and an initial position of the compensation light source, the second calculation unit 1232 calculates the compensation direction of the compensation light source according to the initial position of the compensation light source and the position of the dark region; and calculates the compensation intensity of the compensation light source according to the acquired second threshold, second average brightness value, and third average brightness value.

Figure 10:
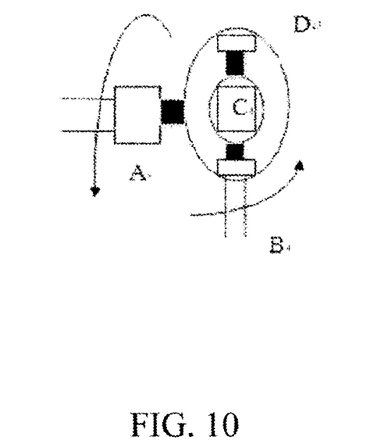
FIG. 10 is a structural diagram of an apparatus for controlling a compensation light source in a compensation module according to an embodiment of the present invention.

In S906, the compensation light source in the compensation module 124 is controlled to perform backlight compensation on the preview image according to the compensation parameter calculated by the second calculation unit 1232;

the compensation module 124 comprises at least one compensation light source, which may be an LED light etc., and the apparatus for adjusting the compensation direction of the compensation light source may be shown in FIG. 11; wherein, A is an apparatus for controlling rotation in left and right directions, in which an apparatus such as a DC voice coil motor etc. is built. B is an apparatus for controlling rotation in up and down directions, which has the same structure and function as A. C is an apparatus which can rotate along with B, and the compensation light source may be fixed on C. D is an apparatus which can rotate along with A, and B and C are fixed on D. The apparatus can perform rotation of the compensation direction of the compensation light source (or the position of the compensation light source) in up, down, left and right directions, so as to change the projection direction of the light source;

in S907, the second judgment unit 1222 in the judgment module 122 judges whether the compensation in step S906 is successful; and if yes, step S908 is performed; otherwise, steps S905, S906, and S907 are performed circularly;

the standard used by the second judgment unit 1222 to judge whether the compensation performed by the compensation module 124 on the preview image is successful is that whether a particular relationship (the second threshold) is satisfied according to the third average brightness value after the dark region is compensated previously and a fourth average brightness value after the preview image is compensated; and if yes, it is considered that the compensation is successful; otherwise, the compensation is not successful;

in S908, the display module 125 displays the preview image or a preview image after the backlight compensation;

in S909, the user picks up the preview image displayed in S908, and stores the preview image in the storage apparatus 13; and resets the compensation parameter of the compensation light source.

For convenience of the implementations of the backlight compensation method according to the present application, the PCB layout of various functional modules in the backlight compensation apparatus according to the embodiments of the present invention should be as compact as possible, since the backlight compensation method according to the embodiments of the present invention needs to rapidly calculate the compensation parameter, and control the compensation light source; and when the compensation module 124 comprises multiple compensation light sources, the multiple compensation light sources can be arranged around the image pick-up apparatus 11, so as to rapidly perform the backlight compensation.

With the implementations of the backlight compensation method, apparatus and terminal according to the embodiments of the present invention, the following beneficial effects are achieved:

firstly, the exposure intensity, direction and time of the flash light in the related art cannot be changed, while the backlight compensation method according to the present document can calculate the compensation parameter according to the preview image, and specifically control the compensation light source according to the compensation parameter, which has a prominent progress as compared to the flash light in the prior art which cannot control the compensation parameter;

secondly, the flash light in the related art judges whether it is turned on according to the average brightness value of the whole preview image, while the backlight compensation method according to the present document judges whether it needs to perform backlight compensation by detecting whether there is a dark region in the preview image, which can achieve more accurate turn-on of control of the backlight compensation as compared to the prior art;

then, the backlight compensation method calculates the compensation parameter of the compensation light source by analyzing the position and average brightness value of the dark region, which has accurate control; and finally, the backlight compensation method detects whether the compensation for the image after backlight compensation is successful, to ensure the effects of the backlight compensation.

In conclusion, with the embodiments of the present invention, a backlight compensation method, apparatus and terminal with a controllable compensation parameter are provided; and when a user performs backlight pick-up using a pick-up device, backlight compensation can be automatically performed on the preview image, so as to display an image with perfect image quality to the user, which improves the user experience.

A person having ordinary skill in the art should understand that all or a part of the steps in the above method can be implemented by programs instructing related hardware, and the programs can be stored in a computer readable storage medium, such as a read-only memory, a disk, or a disc etc. Alternatively, all or a part of the steps in the aforementioned embodiments can also be implemented with one or more integrated circuits. Accordingly, various modules/units in the aforementioned embodiments can be implemented in a form of hardware, or can also be implemented in a form of software functional modules. The present document is not limited to any particular form of combination of hardware and software.

The above description is merely specific embodiments of the present invention, without limiting the present document in any form. Any simple amendment, equivalent variation or modification made on the above embodiments according to the technical substance of the present document should belong to the protection scope of the technical schemes of the present document.

INDUSTRIAL APPLICABILITY

With the embodiments of the present invention, when a user performs backlight pick-up using a pick-up device, backlight compensation can be automatically performed on the preview image, so as to display an image with perfect image quality to the user, which improves the user experience.

What is claimed is:

1. A backlight compensation method, comprising
a processor of a terminal acquiring a preview image through an image pickup apparatus;
the processor judging whether backlight compensation needs to be performed on the preview image;
if yes, the processor calculating a compensation parameter of a compensation light source, and performing backlight compensation on the preview image; and
if not, the processor displaying the preview image on a display apparatus;
wherein, the step of the processor judging whether backlight compensation needs to be performed on the preview image comprises:
the processor detecting whether there is a dark region in the preview image;
if yes, the backlight compensation needs to be performed by the processor;
otherwise, the backlight compensation needs not to be performed by the processor;
wherein, the step of the processor detecting whether there is a dark region in the preview image comprises:
the processor calculating a first average brightness value of a unit frame in the preview image;
the processor calculating a second average brightness value of the preview image according to the first average brightness values of all unit frames;
the processor calculating a first threshold according to the second average brightness value;
the processor comparing the first average brightness values of all unit frames with the first threshold, and judging whether there is a first average brightness value of a unit frame being less than the first threshold;
if yes, the processor forming the dark region by connecting all adjacent units frames of which the first average brightness values are less than the first threshold, that is, there is a dark region in the preview image; and if not, there is no dark region in the preview image.

2. The method according to claim 1, wherein, the compensation parameter comprises a compensation direction and compensation intensity of the compensation light source, and the step of the processor calculating the compensation parameter comprises:

the processor calculating a position and a third average brightness value of the dark region;

the processor calculating an initial position of the compensation light source;

the processor calculating the compensation direction of the compensation light source according to the initial position of the compensation light source and the position of the dark region; and the processor acquiring a second threshold, and calculating the compensation intensity of the compensation light source according to the second average brightness value, the third average brightness value and the second threshold.

3. The method according to claim 1, after the processor performing backlight compensation on the preview image, the method further comprising:

the processor judging whether the backlight compensation is successful;

if not, the processor performing the backlight compensation again until the backlight compensation is successful; and if yes, the processor displaying a preview image after the backlight compensation on the display apparatus.

4. A backlight compensation apparatus, comprising: a compensation module comprising at least a compensation light source, and a hardware display module for displaying an image, and further comprising hardware performing instructions stored in a non-transitory computer readable medium which executes steps in following modules: an acquisition module, a judgment module, and a calculation module, wherein, the acquisition module is configured to: acquire a preview image and output the preview image to the judgment module;

the judgment module is configured to: judge whether backlight compensation needs to be performed on the preview image;

the calculating module is configured to: when backlight compensation needs to be performed on the preview image, calculate a compensation parameter of the compensation light source;

the compensation module is configured to: when backlight compensation needs to be performed on the preview image, perform the backlight compensation on the preview image according to the compensation parameter; and the hardware display module is configured to: display the preview image or a preview image after the backlight compensation;

wherein, the judgment module comprises a first judgment unit, and the first judgment unit is configured to: detect whether there is a dark region in the preview image;

if yes, notify the calculation module to calculate the compensation parameter of the compensation light source; and if not, notify the display module to hardware display the preview image;

wherein, the calculation module comprises a first calculation unit, wherein, the first calculation unit is configured to: calculate a first average brightness value of a unit frame in the preview image, calculate a second average brightness value of the preview image according to the first average brightness values of all unit frames, and calculate a first threshold according to the second average brightness value;

the first judgment unit is further configured to: compare the first average brightness values of all unit frames in the preview image with the first threshold, and judge whether there is a first average brightness value of any unit frame being less than the first threshold: if yes, form the dark region by connecting all adjacent units frames of which the first average brightness values are less than the first threshold, that is, there is a dark region in the preview image; and if not, there is no dark region in the preview image.

5. The apparatus according to claim 4, wherein, the compensation parameter comprises a compensation direction and compensation intensity of the compensation light source, and the calculation module further comprises a second calculation unit, wherein, the first calculation unit is further configured to: calculate a position of the dark region and a third average brightness value of the dark region, and acquire a second threshold; and the second calculation unit is configured to: calculate an initial position of the compensation light source, calculate the compensation direction of the compensation light source according to the initial position of the compensation light source and the position of the dark region; and is further used to calculate the compensation intensity of the compensation light source according to the second average brightness value, the third average brightness value and the second threshold.

6. The apparatus according to claim 4, wherein, the judgment module further comprises a second judgment unit, and the second judgment unit is configured to: judge whether the backlight compensation is successful; if not, notify the calculation module and the compensation module to perform the backlight compensation again until the backlight compensation is successful; and if yes, display a preview image after the backlight compensation and reset the compensation parameter of the compensation light source.

7. A backlight compensation terminal comprising an image pick-up apparatus and a storage apparatus, and further comprising the backlight compensation apparatus according to claim 4; and the backlight compensation apparatus is configured to acquire a preview image through the image pick-up apparatus, detect whether backlight compensation needs to be performed on the preview image, and if yes, calculate a compensation parameter and perform the backlight compensation on the preview image; and the storage apparatus is configured to store an image after the backlight compensation which is picked up by a user.

8. The method according to claim 2, after the processor performing backlight compensation on the preview image, the method further comprising:

the processor judging whether the backlight compensation is successful;

if not, the processor performing the backlight compensation again until the backlight compensation is successful; and if yes, the processor displaying a preview image after the backlight compensation on the display apparatus.

9. The apparatus according to claim 5, wherein, the judgment module further comprises a second judgment unit, and the second judgment unit is configured to: judge whether the backlight compensation is successful; if not, notify the calculation module and the compensation module to perform the backlight compensation again until the backlight compensation is successful; and if yes, display a preview image after the backlight compensation and reset the compensation parameter of the compensation light source.

10. A backlight compensation terminal comprising an image pick-up apparatus and a storage apparatus, and further comprising the backlight compensation apparatus according to claim 5; and the backlight compensation apparatus is configured to acquire a preview image through the image pick-up apparatus, detect whether backlight compensation needs to be performed on the preview image, and if yes, calculate a compensation parameter and perform the backlight compensation on the preview image; and the storage apparatus is configured to store an image after the backlight compensation which is picked up by a user.

* * * * *